United States Patent [19]

Okumura et al.

[11] Patent Number: 5,121,212
[45] Date of Patent: Jun. 9, 1992

[54] AUDIO SIGNAL DEMODULATING CIRCUIT WITH REDUCED POWER CONSUMPTION

[75] Inventors: Naoji Okumura, Osaka; Hisashi Arita, Hyogo; Yuichi Ninomiya; Yoshimichi Ohtsuka, both of Kanagawa; Tadashi Kawashima, Tokyo; Takushi Iwamoto, Matsuyama, all of Japan

[73] Assignees: Matsushita Electric Industrial Co., Ltd.; Nippon Hoso Kyokai, both of Japan

[21] Appl. No.: 499,353

[22] PCT Filed: Oct. 24, 1989

[86] PCT No.: PCT/JP89/01087
§ 371 Date: Aug. 6, 1990
§ 102(e) Date: Aug. 6, 1990

[87] PCT Pub. No.: WO90/04901
PCT Pub. Date: May 3, 1990

[30] Foreign Application Priority Data

Oct. 24, 1988 [JP] Japan .................. 63-267453

[51] Int. Cl.⁵ .......................................... H04N 5/60
[52] U.S. Cl. ...................... 358/198; 358/143; 358/197

[58] Field of Search .............. 358/198, 197, 23, 145, 358/144, 143, 84, 86, 262.1; 375/17, 20; 455/188, 337

[56] References Cited

U.S. PATENT DOCUMENTS 4,821,097  4/1989  Robbins ..................... 358/143

FOREIGN PATENT DOCUMENTS

62-13177  1/1987  Japan .
62-13178  1/1987  Japan .

Primary Examiner—James J. Groody
Assistant Examiner—Sherrie Hsia
Attorney, Agent, or Firm—Mason, Fenwick & Lawrence

[57] ABSTRACT

In an audio signal demodulating circuit, an externally supplied reference clock signal is frequency-divided so that the frequency-divided clock signals are supplied to circuit units constituting the audio signal demodulating circuit as clock signals having lower frequencies. A logic circuit is provided to respond to a timing pulse generated synchronously with a video signal so as to set input data or clock signals supplied to the aforementioned circuit units to a low level or a high level during a time period other than the time period of an audio signal, whereby electric power consumption in the audio signal demodulating circuit is markedly reduced.

4 Claims, 7 Drawing Sheets

MUSE TRANSMISSION SIGNAL FORMAT

AUDIO SIGNAL DEMODULATING CIRCUIT WITH REDUCED POWER CONSUMPTION

TECHNICAL FIELD

The present invention relates to an audio signal demodulating circuit for demodulating an audio signal from a high definition television signal (MUSE signal).

BACKGROUND ART

In recent years, high definition televisions ("high vision"), which provide more impression and deeper presence feeling and higher audio quality than conventional televisions, have been developed. The MUSE system proposed by NIHON HOSO KYOKAI (NHK) is an example of the associated transmission system. In the MUSE system, an audio signal is time-division multiplexed during a video V-blanking period.

Now referring to the drawings, an explanation will be given of a circuit for demodulating an audio signal in the MUSE system.

Figure 5:
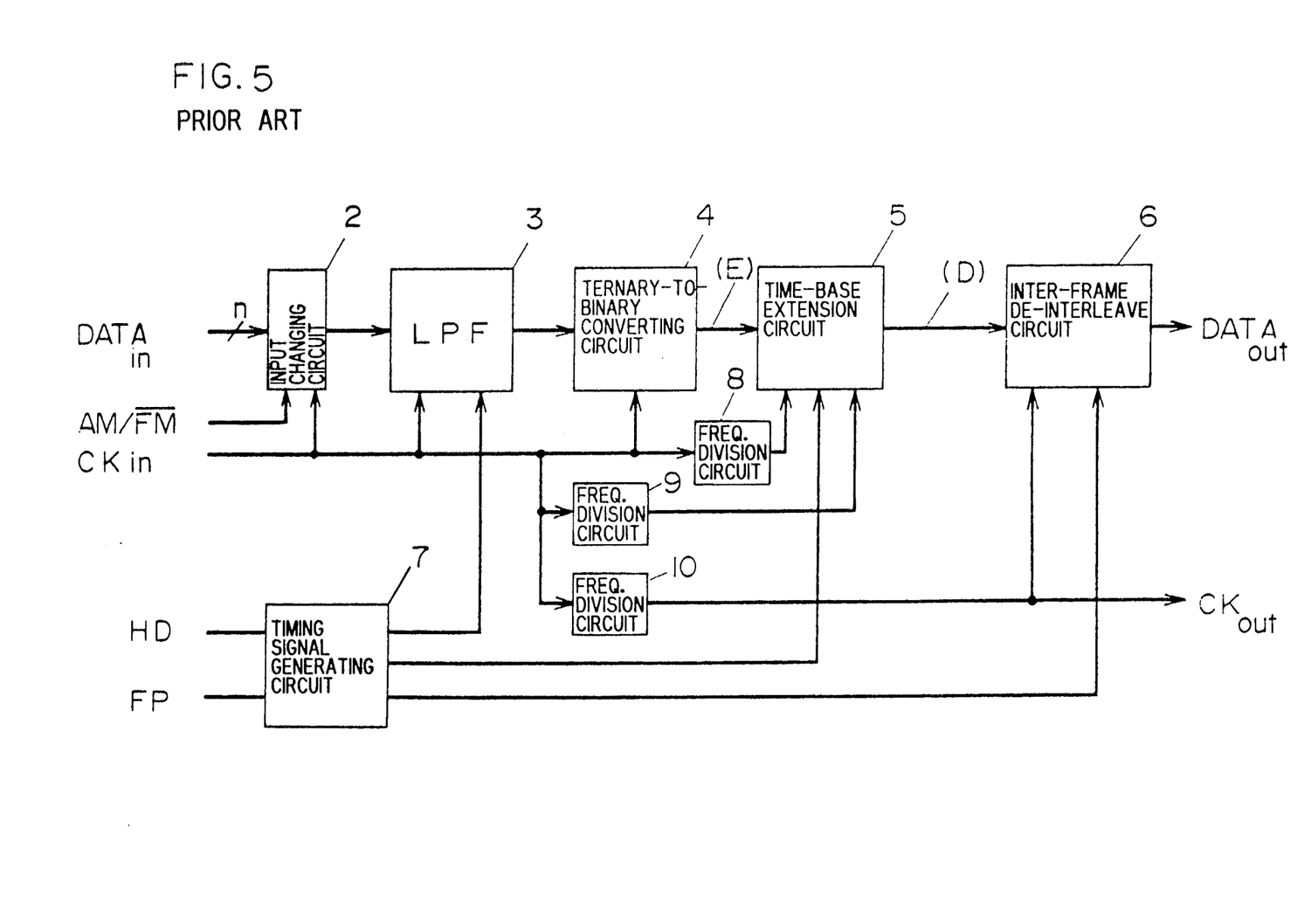
FIG. 5 is a block diagram showing a conventional audio signal demodulating circuit
Figure 6:
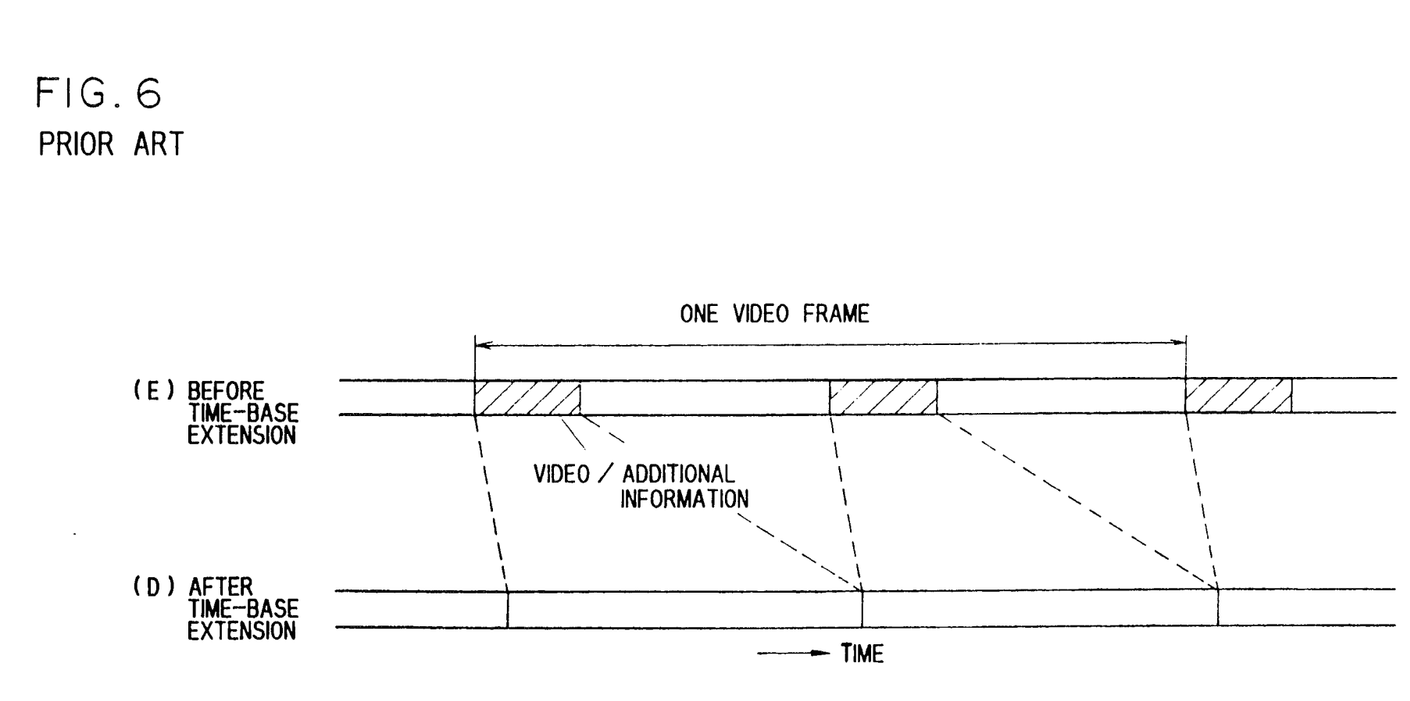
FIG. 6 is a timing chart for an audio signal appearing in the audio signal demodulating circuit shown in FIG. 5.
Figure 7:
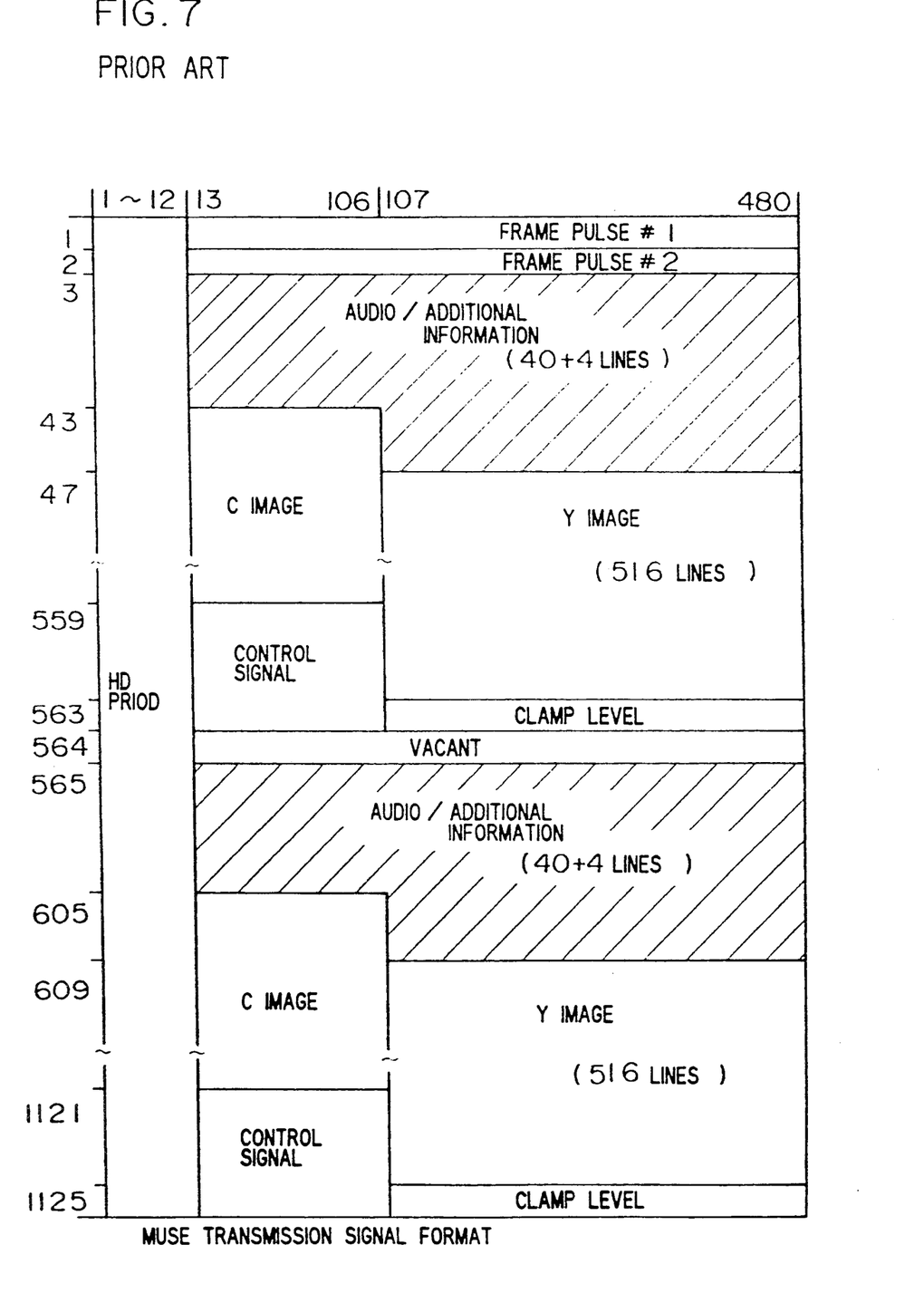
FIG. 7 is a drawing showing a MUSE transmission signal format.

FIG. 5 is a block diagram of a conventional audio signal demodulating circuit, FIG. 6 is a timing chart of an audio signal in the circuit, and FIG. 7 is a MUSE transmission signal format In FIG. 5, numeral 2 is an input changing circuit for changing the gain of an input data signal depending on whether the input data signal is in an AM mode or a FM mode.

Numeral 3 is an audio low pass filter (LPF) circuit for producing an audio data signal upon receipt of an output signal from the input changing circuit 2. Numeral 4 is a ternary-to-binary converting circuit for converting an audio data signal output from the LPF circuit, which is a ternary two symbol audio data signal, into a binary three symbol audio data signal. Numeral 5 is a time-base extension circuit for receiving an audio data signal multiplexed during vertical blanking periods of a video signal and extending the time base of the received audio data signal to restore it to a continuous audio signal. Numeral 6 is an inter-frame de-interleave circuit for canceling the inter-frame de-interleave applied to an audio data signal at the transmission side. Numeral 7 is a timing signal generating circuit for producing several kinds of timing pulses on the basis of a frame pulse (FP) and a horizontal pulse (HP) supplied from an image synchronization circuit (not shown). Numerals 8, 9 and 10 are frequency division circuits for frequency-dividing an input clock.

The operation of the audio signal demodulating circuit as constructed above will be explained below.

First, an n-bit input audio data signal supplied to a data input terminal is changed in its gain corresponding to its mode by the input changing circuit 2, since the multiplexing level of an audio data signal differs between the AM mode and the FM mode. The data signal, which has thus been changed to have an audio multiplexing level common to the AM mode and the FM mode, is supplied to the LPF circuit 3 The LPF circuit 3 constitutes a digital LPF circuit having 6 MHz root cosine roll-off characteristic which serves as an audio low pass filter. The ternary-to-binary converting circuit 4 converts the audio data signal from a ternary two symbol signal into a binary three symbol signal. In this case, an audio signal has been time-multiplexed during the vertical blanking periods of a video signal, as illustrated in the MUSE transmission signal format shown in FIG. 7, to have a time-base arrangement shown at (E) of FIG. 6. The time-base extension circuit 5 extracts this time-multiplexed audio signal and extends its time base to provide a continuous audio signal as shown at (D) of FIG. 6.

Then, since the input audio signal has been previously inter-frame interleaved at the transmission side in order to disperse a possible burst error occurring in the transmission system, the inter-frame de-interleave circuit 6 operates to cancel the inter-frame interleave at the receiving side. Thus, a continuous audio signal is outputted from a data output terminal as an output data.

Additionally, the timing signal generating circuit 7 generates and supplies several kinds of timing signals synchronized with frames of a video signal, such as used for extracting an audio signal in the time-base extension circuit 5, on the basis of a frame pulse (FP) and a horizontal pulse (HP) supplied from the video synchronization circuit (not shown). Further, the frequency division circuits 8, 9 and 10 frequency-divide a basic clock (=16.2 MHz) supplied to a clock input terminal from the outside and produce several kinds of clocks having the frequencies of 2.025 MHz, 1.35 MHz, etc.

However, a conventional audio signal demodulating circuit of the above construction comprises many components operating at a higher clock frequency (16.2 MHz), so that it consumes undesired excessive electric power.

SUMMARY OF THE INVENTION

An object of the present invention is to provide an audio signal demodulating circuit which can reduce electric power consumption.

In order to attain this object, the audio signal demodulating circuit according to the present invention is constructed, for example, to frequency-divide a clock supplied from the outside and to supply the divided clocks as clock signals for individual circuits, and it also comprises a logic circuit for fixing a clock or input data supplied to the circuits, which process a signal before it is subjected to time-base extension, to a high level or a low level, during a time period for processing a signal other than an audio signal, by using a timing pulse generated by a timing generating circuit on the basis of a frame pulse and a horizontal pulse.

BEST MODE FOR CARRYING OUT THE INVENTION

Figure 1:
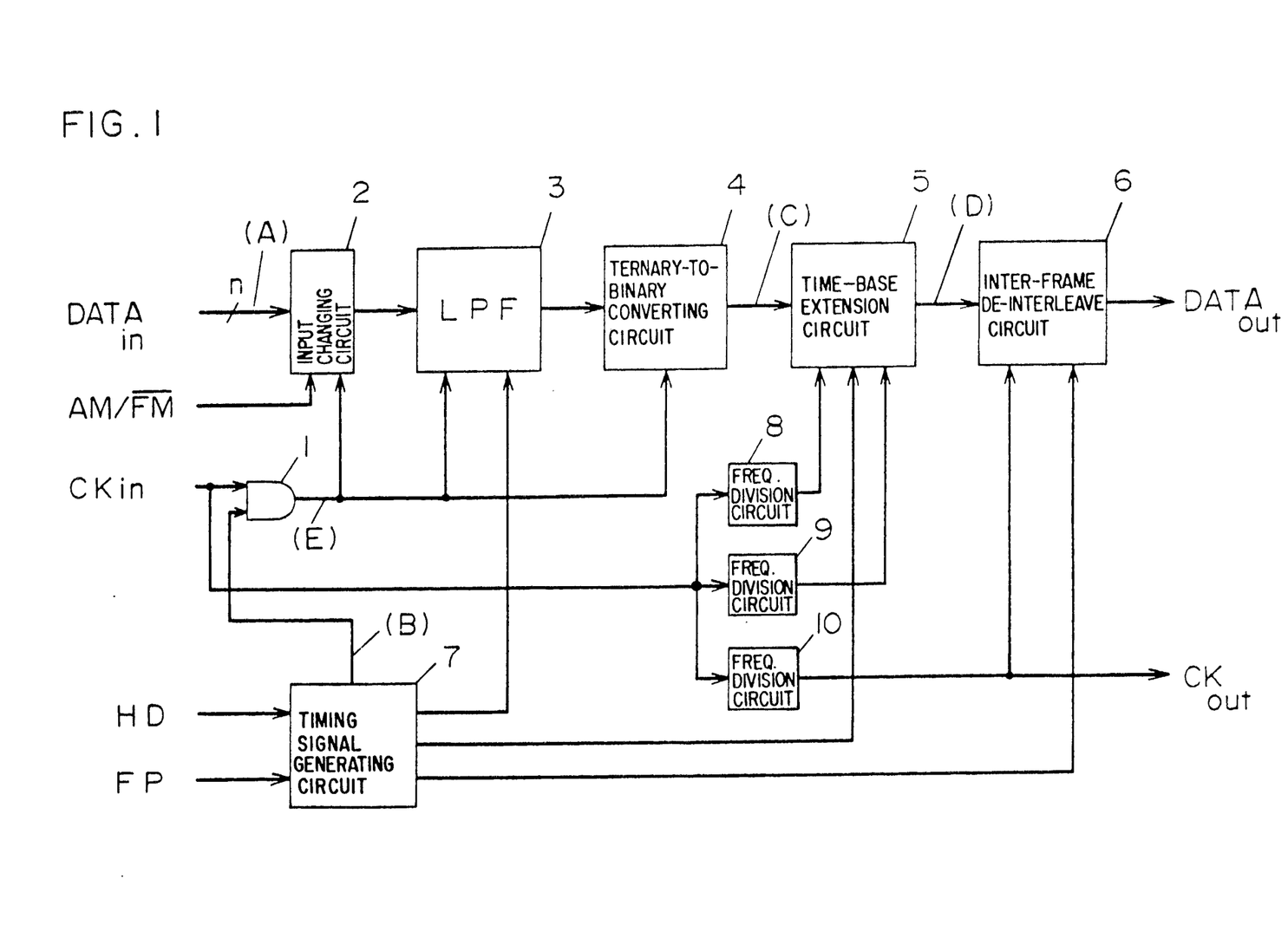
FIG. 1 is a block diagram showing the audio signal demodulating circuit according to an embodiment of the present invention.
Figure 2:
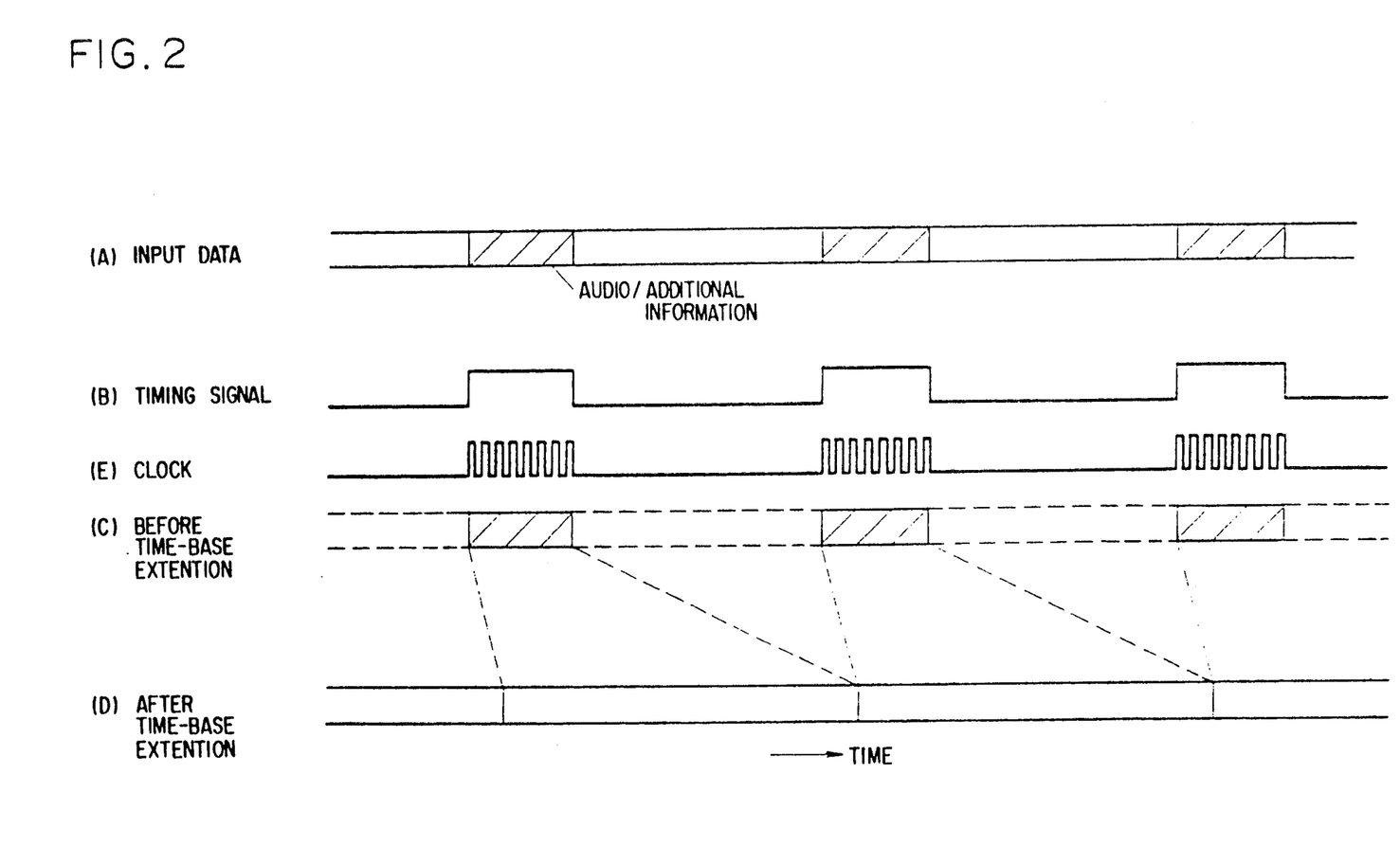
FIG. 2 is a timing chart for signals appearing in the audio signal demodulating circuit shown in FIG. 1.

Now referring to the drawings, an explanation will be given of an audio signal demodulating circuit according to on embodiment of the present invention. FIG. 1 is a block diagram showing the audio signal demodulating circuit according to an embodiment of the present invention. FIG. 2 is a timing chart for signals appearing in the audio signal demodulating circuit.

In FIG. 1, numeral 2 is an input changing circuit; numeral 3 is an LPF circuit; numeral 4 is a ternary-to-binary converting circuit; numeral 5 is a time-base extension circuit; numeral 6 is an interframe de-interleave circuit; and numeral 7 is a timing generating circuit. These constituent circuits are identical to those of the conventional audio signal demodulating circuit. The audio signal demodulating circuit according to the present invention is characterized by the provision of a logic circuit 1 for setting an externally supplied signal to a low level during a time period for processing a signal other than an audio signal by using an output signal from the timing signal generating circuit 7.

In the above arrangement, an input data signal shown at (A) of FIG. 2 is applied to the input changing circuit 2, whose gain is changed in accordance with the AM mode and the FM mode having different audio signal multiplexing levels, so that the audio signal multiplexing levels may be made equal to each other. Then, in the LPF circuit 3, the audio signal thus changed passes through a low-pass filter for audio signals having a 6 MHz root cosine roll-off characteristic. Then, the audio signal is converted from a ternary two symbol signal into a binary three symbol signal through the ternary-to-binary converting circuit 4.

On the other hand, several kinds of timing pulses synchronized with a video signal are generated through the timing generating circuit 7 on the basis of a frame pulse (FP) and a horizontal pulse (HP) supplied from a video synchronization circuit (not shown). One of the timing pulses is a pulse such as shown at FIG. 2(E) which is synchronized with the period of the audio signal. By using this pulse such as shown at FIG. 2(E), the logic circuit 1 fixes the clocks to a low (or high) level during a time period for processing signals other than an audio signal. The resultant clocks are used as a clock signal for the input changing circuit 2, the LPF circuit 3 and the ternary-to-binary converting circuit 4. Therefore, the output from the ternary-to-binary converting circuit 4 is substantially fixed to the low (or high) level during the period other than the audio signal period, as shown at FIG. 2(C).

The time-base extension circuit 5 extracts the audio signal, which has been time-multiplexed during a video vertical blanking period, and extends its time-base to form a continuous audio signal as shown at FIG. 2(D).

Further, the inter-frame de-interleave circuit 6 cancels the inter-frame interleave applied to the audio signal at the transmission side to produce an output data.

Additionally, the frequency division circuits 8, 9 and 10 frequency-divide a basic clock (=16.2 MHz) supplied from the outside to supply (resultant) clocks having the frequencies of 2.025 MHz and 1.35 MHz to the time-base extension circuit 5 and the inter-frame de-interleave circuit 6.

In accordance with the present invention, the logic circuit 1 is provided to fix the clock signal to a low (or high) level during the period other than the audio signal period, so that the clock signal and the input data signal are fixed during the period other than the audio signal period, thereby greatly reducing electric power consumption.

Figure 3:
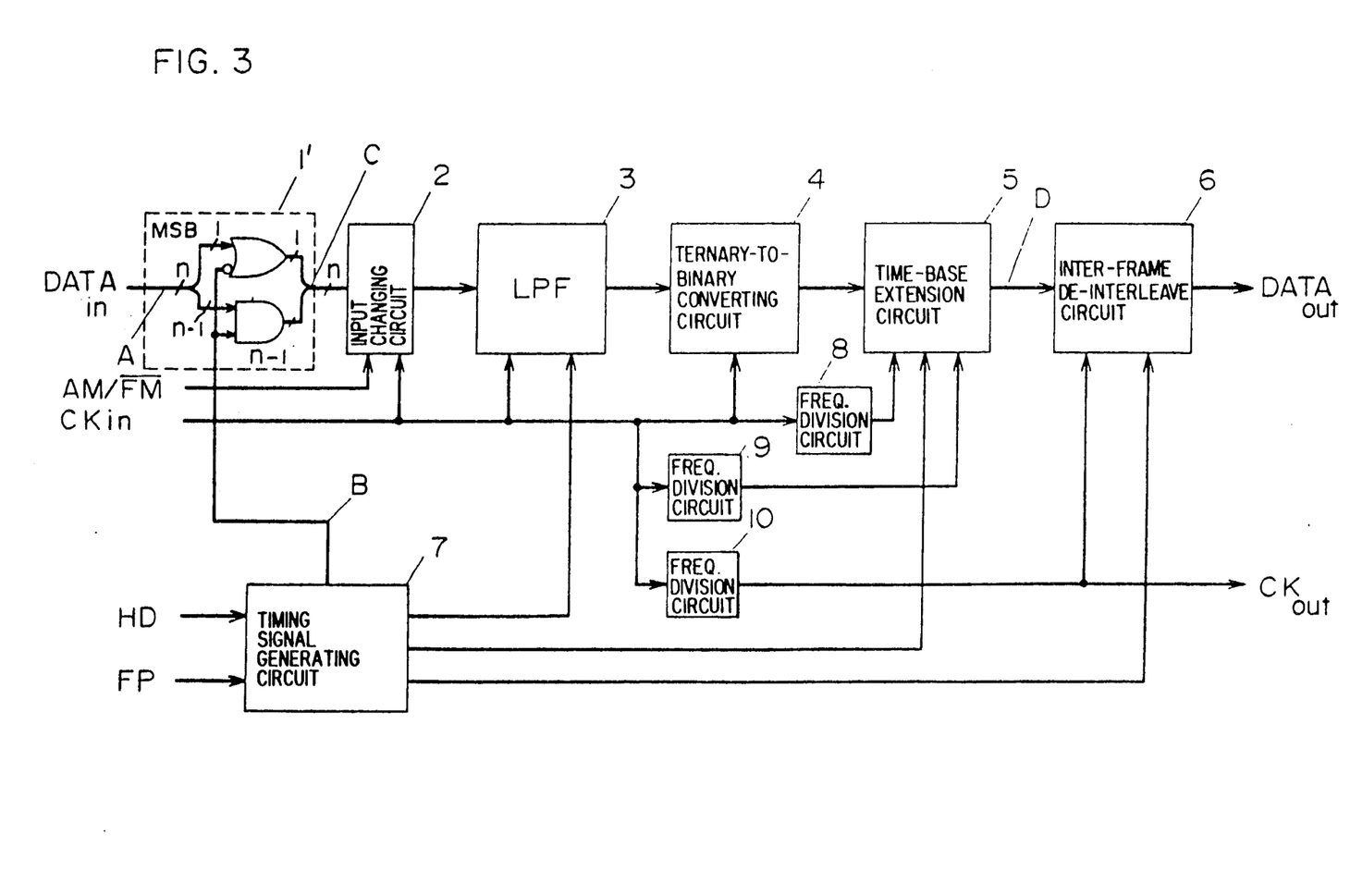
FIG. 3 is a block diagram showing the audio signal demodulating circuit according to another embodiment of the present invention.
Figure 4:
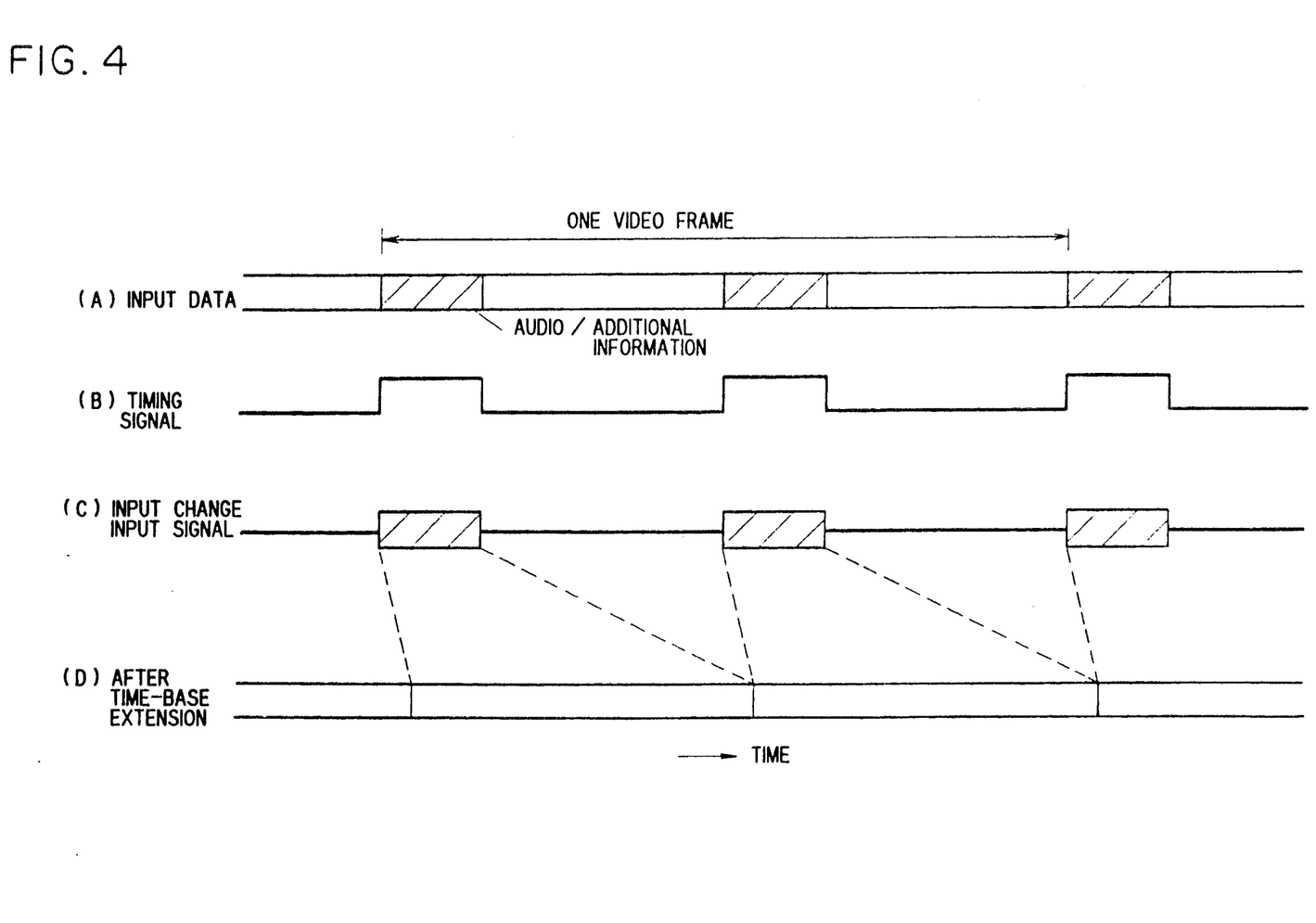
FIG. 4 is a timing chart for signals appearing in the audio signal demodulating circuit shown in FIG. 3.

FIGS. 3 and 4 show the second embodiment of the present invention. In this embodiment, the timing generating circuit 7 generates a timing pulse signal such as shown at FIG. 4(B) which is synchronized with a video signal. By using this timing pulse signal, a logic circuit 1' operates to set only the MSB's of the m-bits signal during the period other than the audio signal period to a high level and the remaining (n-l)-bits to a low level as shown at FIG. 4(C). Thus, in this embodiment, the level of the signal during the period other than the audio signal period is fixed, so that electric power consumption can be reduced.

INDUSTRIAL APPLICABILITY

In accordance with the present invention, a logic circuit is provided which uses a timing pulse generated in the timing signal generating circuit in synchronism with a video signal so as to fix the clock signal or input data signal to be supplied to the circuits. The logic circuit also processes a signal before it is subjected to time-base extension, to a high level or a low level. Thus, the clock signal or input data signal during the period other than the audio signal period can be fixed to a high level or a low level. In this way, electric power consumption of the entire audio signal demodulating circuit can be remarkably reduced.

We claim:

1. An audio signal demodulating circuit comprising:
   a timing signal generating circuit for generating several kinds of timing pulses on the basis of a frame pulse and a horizontal pulse;
   an input changing circuit for changing the gain of input data depending on whether the input data is in an AM mode or an FM mode;
   an audio low pass filter to which an output of said input changing circuit is applied;
   a ternary-to binary converting circuit for converting an output of said audio low pass filter from a ternary two symbol signal to a binary three symbol signal;
   a time-base extension circuit for extending an output of said ternary-to-binary converting circuit to form a continuous audio signal;
   an inter-frame de-interleave circuit for cancelling the inter-frame interleave applied to an audio signal at the transmission side;
   frequency division circuits for frequency-dividing an externally supplied clock signal and supplying divided clock signals to said time base extension circuit and said inter-frame de-interleave circuit; and
   a logic circuit responsive to the timing pulse generated by said timing signal generating circuit for setting clock signals to be supplied to said input changing circuit, said audio low pass filter and said ternary-to-binary converting circuit to either a high level or a low level during a time period other than the time period of the audio signal.

2. An audio signal demodulating circuit comprising:
   a timing signal generating circuit for generating several kinds of timing pulses on the basis of a frame pulse and a horizontal pulse;

an input changing circuit for changing the gain of an input data depending on whether the input data is in AM mode or in FM mode;

an audio low pass filter to which an output of said input changing circuit is applied;

a ternary-to-binary converting circuit for converting an output of said audio low pass filter from a ternary two symbol signal to a binary three symbol signal;

a time-base extension circuit for extending an output of said ternary-to-binary converting circuit to form a continuous audio signal;

an inter-frame de-interleave circuit for canceling the inter-frame interleave applied to an audio signal at the transmission side;

frequency division circuits for frequency-dividing an externally supplied clock signal and supplying divided clock signals to said time-base extension circuit and inter-frame de-interleave circuit; and a logic circuit for setting the input data to either a high lever or a low level during a time period other than that of the audio signal by using the timing pulse generated by said timing signal generating circuit.

3. An audio signal demodulating circuit according to claim 1, wherein said logic circuit comprises an AND circuit having a first input connected to an output of said timing signal generating circuit, and an output connected to an input of said input changing circuit, an input of said audio low pass filter and an input of said ternary-to-binary converting circuit, respectively, thereby setting output clock signals to be supplied to said input changing circuit, said audio low pass filter and said ternary-to-binary converting circuit at a low level during a time period other than the time period of the audio signal.

4. An audio signal demodulating circuit according to claim 2, wherein said logic circuit comprises:

an inverter circuit having an input connected to an output of said timing signal generating circuit for inverting a timing pulse from said timing signal generating circuit which timing pulse operates to set input data other than the audio signal to a given level;

an OR circuit having a first input connected to input a most significate bit into the input data and a second input connected to an output of said inverter circuit, thereby operating to set the input data other than the audio signal to a high level and to supply an output signal to said input changing circuit; and a plurality of AND circuits having first inputs connected to input bits other than the most significant bit in the input data, respectively, and second inputs connected respectively to the output of said timing signal generating circuit in the same way as said inverter circuit, thereby operating to fix the input data other than the audio signal to a low level and to supply an output signal to said input changing circuit.

* * * * *